US012683322B2

(12) United States Patent
Cindric et al.

(10) Patent No.: US 12,683,322 B2
(45) Date of Patent: Jul. 14, 2026

(54) PERIPHERAL SEAL WITH SLOPED RIBS

(71) Applicant: TE Connectivity Solutions GmbH, Schaffhausen (CH)

(72) Inventors: Melani Cindric, Middletown, PA (US); David Swartz, York, PA (US); Vinayakumar Shettar, Middletown, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 351 days.

(21) Appl. No.: 18/544,517

(22) Filed: Dec. 19, 2023

(65) Prior Publication Data

US 2025/0202158 A1 Jun. 19, 2025

(51) Int. Cl.
*H01R 13/52* (2006.01)

(52) U.S. Cl.
CPC ................................ *H01R 13/5202* (2013.01)

(58) Field of Classification Search
None
See application file for complete search history.

(56) References Cited

U.S. PATENT DOCUMENTS 5,151,045 A 9/1992 Cravens et al.
5,234,352 A * 8/1993 Bungo ............... H01R 13/5219 439/282
5,775,944 A * 7/1998 Flask ................... H01R 13/743 439/556
5,895,290 A 4/1999 Self, Jr.
6,986,677 B2 * 1/2006 Janssen .............. H01R 13/5208 439/275
7,591,678 B2 * 9/2009 Ikeya ................... H01R 13/743 439/557
7,607,940 B2 * 10/2009 Ikeya ................. H01R 13/5221 439/559
8,241,051 B2 8/2012 Yi et al.
9,397,438 B2 7/2016 Chen
9,413,099 B2 8/2016 Vanslambrouck et al.
10,090,615 B1 10/2018 Yi et al.
10,847,927 B2 11/2020 Maddens et al.
10,879,645 B2 12/2020 Zhang et al.
11,804,669 B2 * 10/2023 Komoto ............. H01R 13/5219
2009/0163058 A1 6/2009 Craig et al.
2017/0005432 A1 1/2017 Bernhart
2020/0106209 A1 4/2020 Takahashi et al.

FOREIGN PATENT DOCUMENTS

KR 20150051225 A * 5/2015 ................ F16L 5/14

* cited by examiner

*Primary Examiner* — Tho D Ta
(74) *Attorney, Agent, or Firm* — 62424—The Whitaker LLC

(57) ABSTRACT

A sealed panel mount electrical connector and a seal for use in an electrical connector. The seal includes a base member and projections. The projections extend from the base member. Each of the axes of the projections extending at an angle of greater than 0 degrees and less than 90 degrees relative to a longitudinal plane of the base member.

19 Claims, 3 Drawing Sheets

PERIPHERAL SEAL WITH SLOPED RIBS

FIELD OF THE INVENTION

The invention relates to peripheral seal with sloped ribs which reduces mating force and improves sealing performance.

BACKGROUND OF THE INVENTION

Electrical connector are often mounted in a cutout in a panel to provide an interface between electrical devices on opposite sides of the panel. It is often necessary to provide a good seal between the electrical connector and the panel in order to prevent exchange of gas or liquid through the cutout of the panel. Panel mount electrical connectors generally have a flange which is abutted against the panel. The panel is made from a plastic material, and the panel is often wavy or has other deviations in planarity, thereby causing gaps between the flange and the panel. Further, different panels may vary in thickness, thereby making it difficult to consistently maintain the flange against the panel.

If not properly sealed, liquid or gas may seep through the gap between the panel and the connector, adversely affecting the components and causing failure of the device in which the connector is mounted. In use, an insulative foam may be injected over the panel or the connector. If the panel is wavy or if the flange is not abutted against the panel, the foam will shoot through gaps between the connector and the panel, thereby causing mess and splatter in unwanted areas. This problem is exacerbated when wires extending from the connector are pulled and bent during assembly, thereby cocking the connector in the cutout and causing a larger gap. A further problem exists in that the foam may enter the connector through gaps around the wires and may interfere with electrical reliability of the connector.

In other applications, connectors may include an elastomeric seal at the flange to prevent intrusion of gas or liquid between the flange and the panel. However, many of the known seals do not have sufficient structural flexibility to provide proper sealing and vibration dampening for a wide range of dimensions or in a wide range of environments. In addition, mating and un-mating forces associated with known seals makes it difficult to access when service is required.

It would, therefore, be beneficial to have a peripheral wedge seal which can be used to effectively seal the assembly over a wide range of functional dimensions, provides for lower mating and un-mating forces, provides more compliancy, and provides sufficient vibration dampening between the plug connector and the receptacle connector even in harsh environments. It would also be advantages to the seal to have sufficient structural integrity to prevent the flow of foam to unwanted areas.

SUMMARY OF THE INVENTION

The following provides a summary of certain illustrative embodiments of the present invention. This summary is not an extensive overview and is not intended to identify key or critical aspects or elements of the present invention or to delineate its scope.

The seal member of the present invention includes angled, sloped or inclined projections or ribs which distribute the forces evenly across a surface area of a panel or mating connector and across the larger contact area of the projections or ribs. As a result, the mating force is spread out over a wider region, reducing the localized pressure on any specific point.

The angled, sloped or inclined projections or ribs reduce the frictional forces between the seal member and the mating panel or mating connector. The projections or ribs allow for a sliding or rolling action as the seal member contacts the panel or mating connector, thereby requiring less force to install or remove the seal member and connector from the panel or mating connector.

The angled, sloped or inclined orientation of the projections or ribs allows the projections or ribs to act as wedges, pushing against the mating panel and creating a tighter seal with lower force. Consequently, the seal member ensures that the connector will be sealed to the mounting panel or mating connector regardless of waviness in the panel or mating connector or variations in thickness of different panels or mating connector, resulting in enhanced sealing performance.

An embodiment is directed to a seal for use with an electrical connector. The seal includes a base member and projections. The projections extend from the base member. Each of the axes of the projections extending at an angle of greater than 0 degrees and less than 90 degrees relative to a longitudinal plane of the base member.

An embodiment is directed to a sealed panel mount electrical connector having a dielectric housing and a seal member. The seal member is positioned on the dielectric housing. The seal member includes a base member and projections. The projections extend from the base member. Axes of the projections extend at angles of greater than 0 degrees and less than 90 degrees relative to a longitudinal plane of the base member.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

Figure 1:
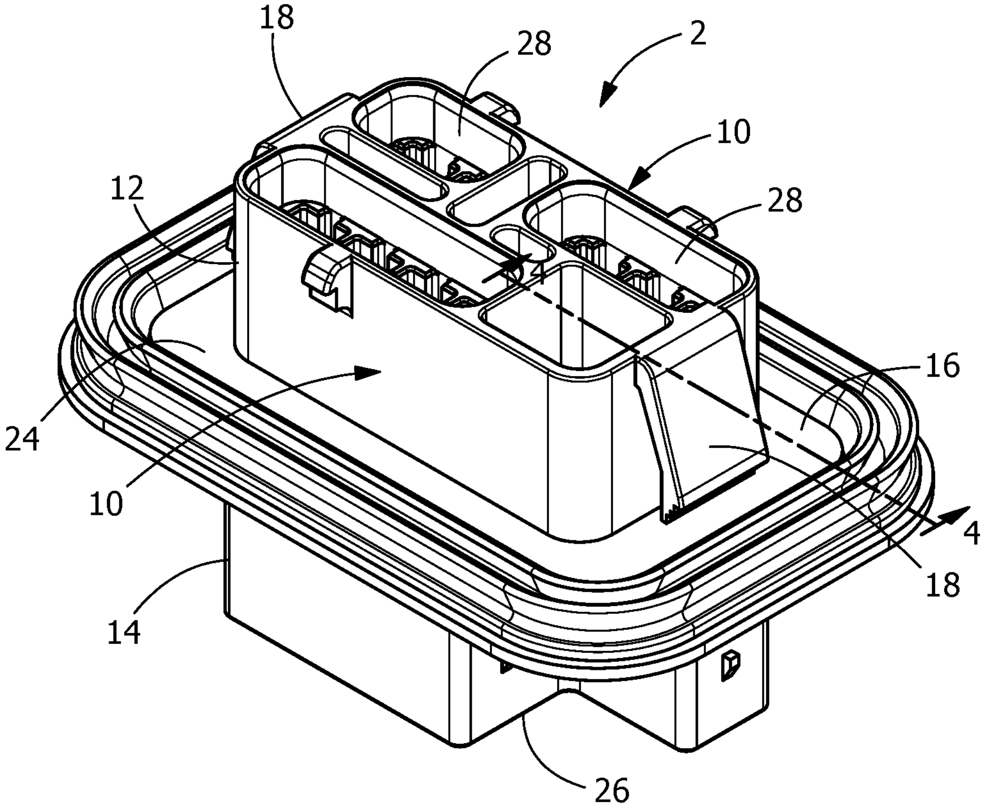
FIG. 1 is a top, side perspective view of an illustrative electrical connector prior to being inserted into an opening of an illustrative panel, the electrical connector has an illustrative peripheral seal positioned thereon.
Figure 2:
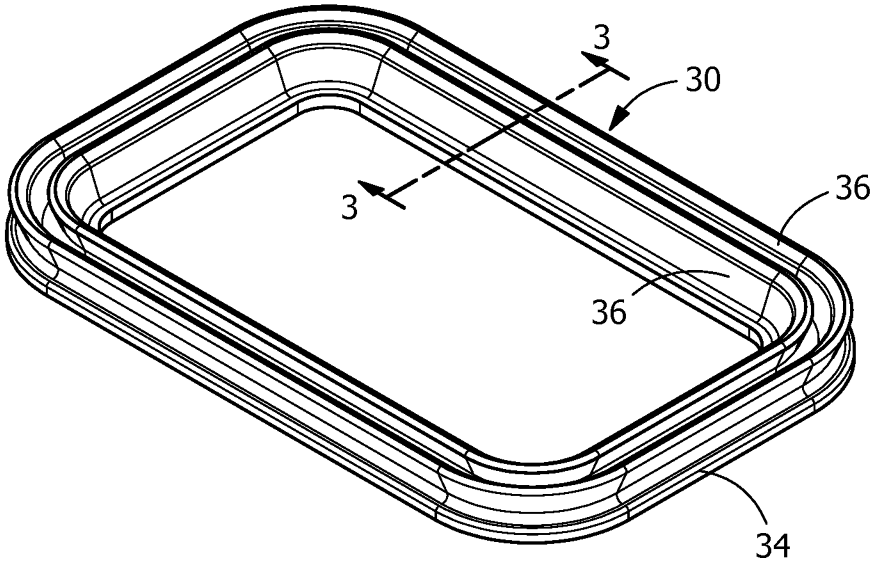
FIG. 2 is a perspective view of the peripheral seal of FIG. 1.

The accompanying drawings, which are incorporated into and form a part of the specification, schematically illustrate one or more exemplary embodiments of the invention and, together with the general description given above and detailed description given below, serve to explain the principles of the invention.

DETAILED DESCRIPTION OF THE INVENTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as “lower,” “upper,” “horizontal,” “vertical,” “above,” “below,” “up,” “down,” “top” and “bottom” as well as derivative thereof (e.g., “horizontally,” “downwardly,” “upwardly,” etc.) should be construed to refer to the orientation as then described or as shown in the drawing under discussion. These relative terms are for convenience of description only and do not require that the apparatus be constructed or operated in a particular orientation unless explicitly indicated as such. Terms such as “attached,” “affixed,” “connected,” “coupled,” “interconnected,” and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

As shown in FIGS. 1 and 4-6, an illustrative sealed panel mount electrical connector 2 includes a dielectric housing 10 and an illustrative seal member 30 according to the invention. The housing 10 includes a forward portion 12 and a rearward portion 14. A flange 16 extends laterally around the housing 10 between the forward portion 12 and the rearward portion 14. The forward portion 12 is insertable through a cutout or opening 20 in a mounting panel 22 (FIGS. 5 and 6) which may be, for example, a wall of an appliance or other piece of equipment. While the connector 2 can be configured to accommodate different panel 22 thickness, in various illustrative embodiments, the panel 22 may range in thickness from approximately 0.8 mm to approximately 2.0 mm.

The forward portion 12 is configured for mating with a complementary electrical connector (not shown). The flange 16 is dimensioned larger than the opening 20 so that a front face 24 of the flange 16 will confront the mounting panel 22 around the opening 20. The housing 10 has latches 18 which are arranged in opposition to the flange 16 to capture the mounting panel 22.

The rear portion 14 has a rear face 26. Conductor-receiving cavities 28 extend from the rear face 26 through the housing 10 and are open at a front of the forward portion 12. The cavities 28 can hold terminals (not shown) which are attached to conductors (not shown) that extend from the housing 10 through the rear face 26.

The connector 2 shown in the figures is merely illustrative. The connector 2 may have different configurations and different features without departing from the scope of the invention. In addition, while the connector 2 is shown mating with a panel 22, the connector 2 may be mated with a mating connector or the like.

Figure 4:
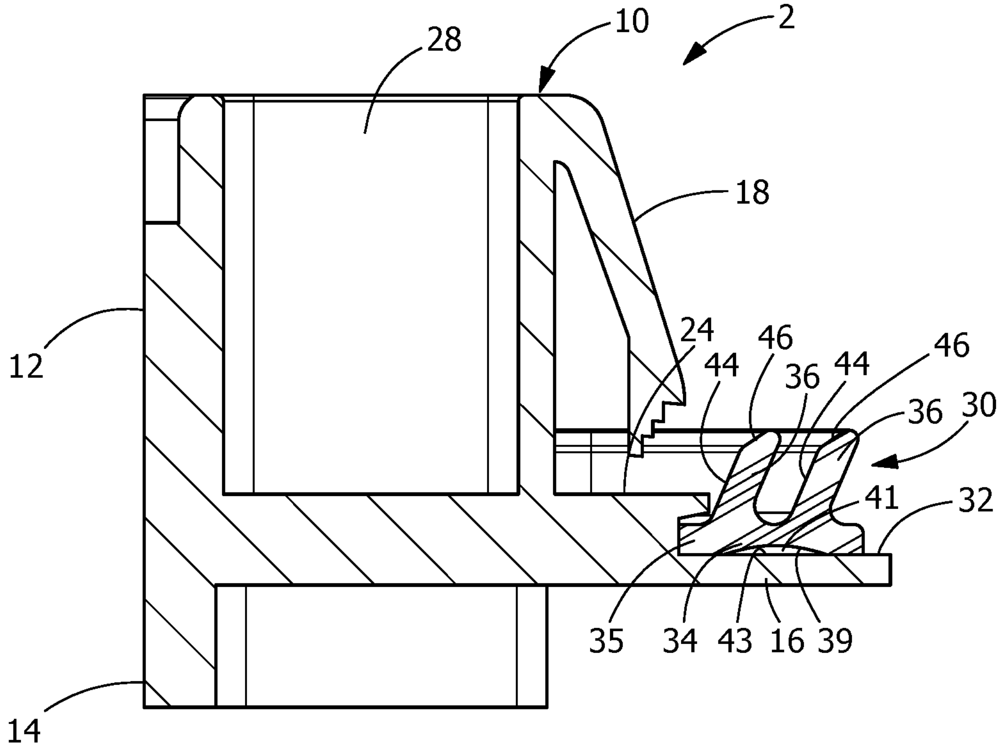
FIG. 4 is a cross-sectional view of the electrical connector and panel taken along line 4-4 of FIG. 1, the electrical connector is shown prior to being inserted into the opening of the panel.
Figure 5:
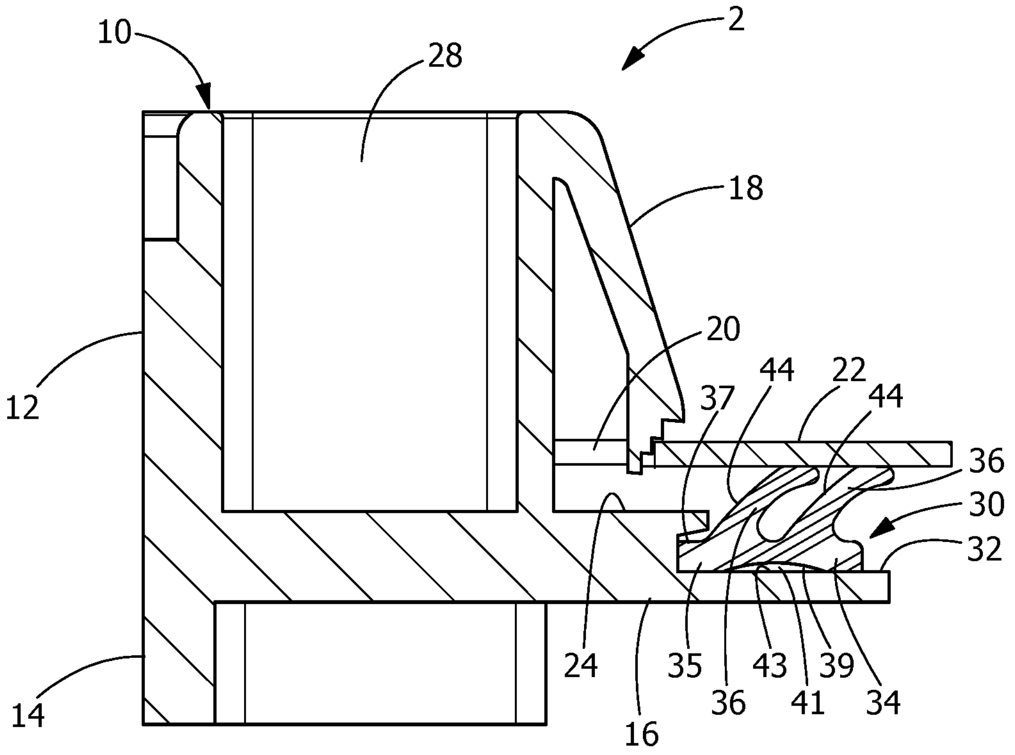
FIG. 5 is a cross-sectional view similar to that of FIG. 4, the electrical connector is shown fully inserted into the opening of the panel, with the peripheral seal fully engaging the panel.
Figure 6:
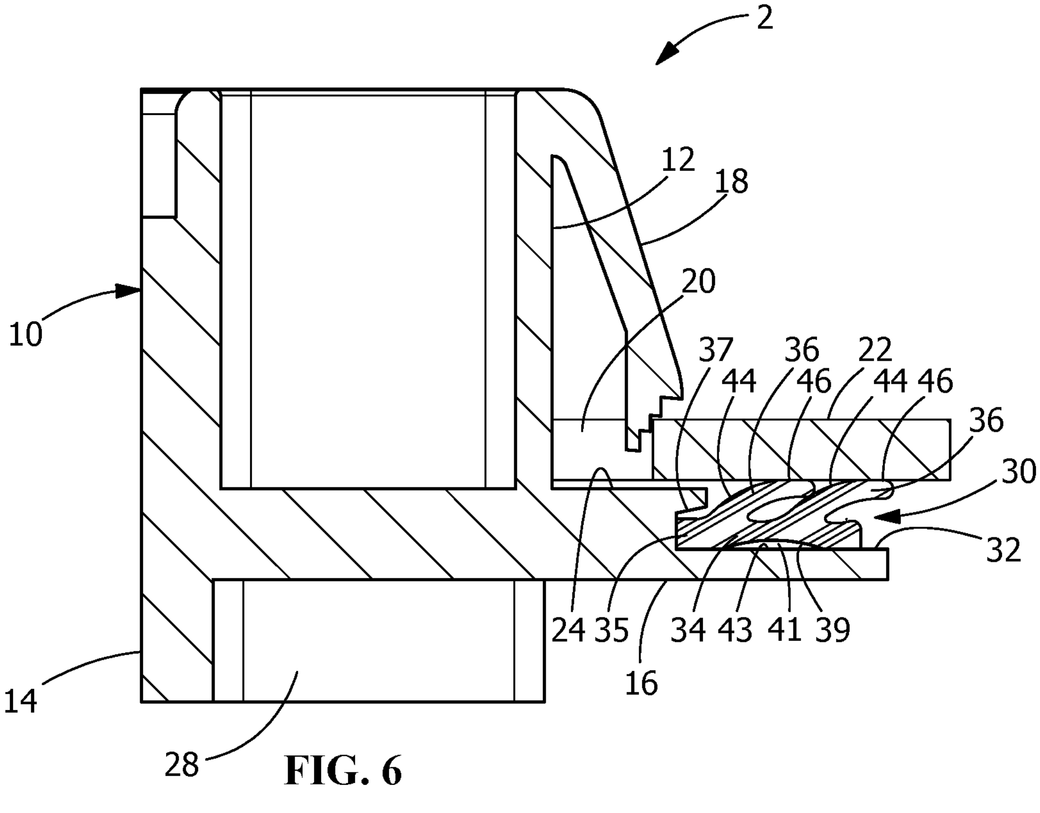
FIG. 6 is a cross-sectional view similar to that of FIG. 5, the electrical connector is shown fully inserted into the opening of an alternate panel, with the peripheral seal fully engaging the alternate panel.

The seal member 30 is a flange or peripheral seal which extends proximate to the circumference of the flange 16. As shown in FIGS. 4-6, the seal member 30 is positioned in a seal receiving recess 32 of the flange 16. The seal receiving recess 32 extends proximate to the circumference of the flange 16. The seal member 30 may be made from any material which has the sealing and flexibility requirements needed to provide a proper seal between the flange 16 and the panel 22. Such materials include, but are not limited to an elastomeric material such as silicon rubber.

The seal member 30 has a base member 34 and projections or ribs 36 which extend from the base member 34. The base member 34 is configured to be positioned and maintained in the seal receiving recess 32 of the flange 16. In the illustrative embodiment shown, the base member 34 has a retaining lip or projection 35 which extends from an end thereof. The retaining projection is dimensioned to be received in a retaining recess 37 which projects from the seal receiving recess 32. The cooperation of the retaining projection 35 with the retaining recess 37 helps to maintain the base member 34 and the seal member 30 is position on the flange 16 of the connector 2.

When initially positioned in the seal receiving recess 32, the base member 34 of the seal member 30 has an arcuate or curved bottom surface 39. As shown in FIG. 4, the arcuate or curved bottom surface 39 provides a space 41 between the arcuate or curved bottom surface 39 and a surface 43 of the flange 16. As the seal member 30 is configured for variable flexibility (differing mating forces depending on panel 22 thickness) the arcuate or curved bottom surface 39 is configured to allow arcuate or curved bottom surface 39 to bend and fill space 41 when needed.

Figure 3:
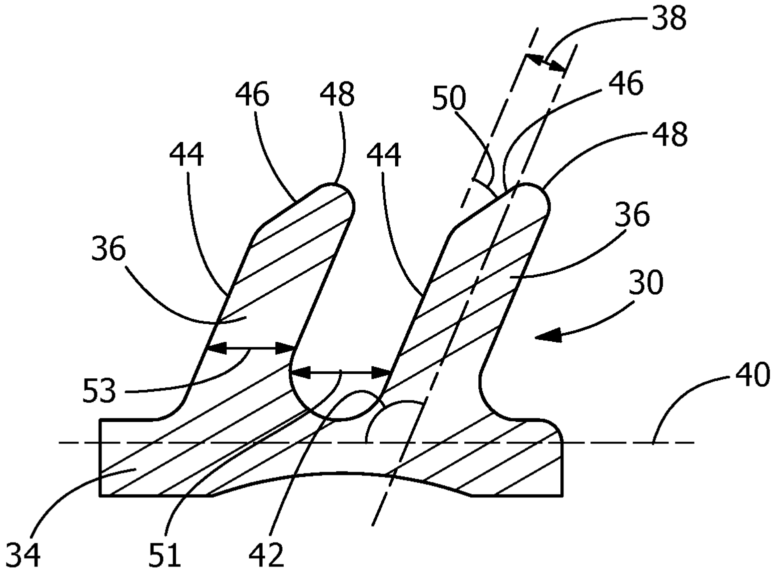
FIG. 3 is an enlarged cross-sectional view of the peripheral seal taken along line 3-3 of FIG. 2.

In the illustrative embodiment shown in FIG. 3, two projections or ribs 36 extend from the base, but other numbers of projections or ribs 36 may be provided. The projections or ribs 36 do not extend in a direction in which the axis 38 of the projections or ribs 36 is perpendicular to a longitudinal plane 40 of the base member 34. Instead, the axis 38 of the projections or ribs 36 extends at an angle 42 of greater than 90 degrees and less than 180 degrees relative to the plane 40 of the base member 34. The projections or ribs 36 may extend at the same angle 42 or each projection or rib 36 may extend at a different angle 42. The angle 42 that the axis 38 of the projections or ribs 36 extends relative to the plane 40 of the base member 34 may be between 110 degrees and 130 degrees, between 110 degrees and 120 degrees. In the embodiment shown, the axis 38 of the projections or ribs 36 extend at the same angle relative to the plane 40 of the base member 34, however other configurations may be used.

As the axis 38 of the projections or ribs 36 extends at an angle relative to the plane 40 of the base member 34, first panel engaging surfaces 44 are sloped or inclined relative to the plane 40 of the base member 34 at the same angle as the axis 38. The first panel engaging surfaces 44 have further angled second panel engaging surfaces 46 provided proximate free ends 48 of the projections or ribs 36. The second panel engaging surfaces 46 extend at an angle 50 relative first panel engaging surfaces 44. The angle 50 is greater than 0 degrees and less than 90 degrees, for example, the angle 50 may be between 30 degrees and 80 degrees, between 40 degrees and 70 degrees, between 30 degrees and 50 degrees.

The projections or ribs 36 are spaced apart by a distance 51. The distance 51 may vary according to the dimensions of the projections or ribs 36. However, the distance 51 is sufficient to allow the projections or ribs 36 to deform when the connector 2 is mated to a thick panel 22, as shown in FIG. 5.

In general, the projections or ribs 36, including the thickness 53 of the projections or ribs 36 and the spacing or distance between the projections or ribs 36 are configured to maintain security against incoming debris, liquids, contaminants and sealing by foaming or other materials. In one illustrative embodiment, the angle 42 is approximately 113 degree, the projections or ribs 36 have a thickness 53 of approximate 1.18 mm thick ribs, and the distance 51 between the projections or ribs 36 is approximately 1.40 mm.

When the connector 2 is mounted on the panel 22, the second panel engaging surfaces 46 of the projections or ribs 36 initially engage the panel 22. Continued mating causes the projections or ribs 36 to deform. As this occurs, the first panel engaging surfaces 44 is moved into engagement with the panel 22, as shown in FIG. 5. In the fully inserted position, as shown in FIG. 5, the second panel engaging surfaces 46 and portion of the first panel engaging surfaces 44 are provided in engagement with the panel 22 to provide proper sealing between the connector 2 and the panel 22.

As shown in FIG. 6, when the connector 2 is inserted into an alternate panel 22', which has a thickness greater than panel 22, the seal member 30 operates in the same manner. The second panel engaging surfaces 46 of the projections or ribs 36 initially engage the panel 22'. Continued mating causes the projections or ribs 36 to deform. As this occurs, the first panel engaging surfaces 44 is moved into engagement with the panel 22'. In the fully inserted position, as shown in FIG. 6, the second panel engaging surfaces 46 and the first panel engaging surfaces 44 are provided in engagement with the panel 22' to provide proper sealing between the connector 2 and the panel 22'. With a thicker panel 22', the base member 34 may be deformed or stretched, causing the arcuate or curved bottom surface 39 to move into space 41. This allows the force needed to deform the seal member 30 to be reduced.

When the connector 2 is fully inserted on the panel 22, 22' or mated with a mating connector (not shown), the seal member 30 is under pressure, the angled, sloped or inclined projections or ribs 36 engage a larger surface area of the panel 22, 22' or mating connector than projections or ribs that are not sloped or angled. The angled, sloped or inclined configuration of the projections or ribs 36 help distribute the forces evenly across the larger surface area of the panel 22, 22' or mating connector and across the larger contact area of the projections or ribs 36. As a result, the mating force is spread out over a wider region, reducing the localized pressure on any specific point. This feature improves the overall durability and lifespan of the seal member 30 and reduces compressive forces. Fine-tuning the angles 42, 50 of the projections or ribs 36 can help achieve the desired reduction in mating force while ensuring an effective seal.

The angled, sloped or inclined projections or ribs 36 can reduce the frictional forces between the seal member 30 and the mating panel 22, 22' or mating connector. Because of the angle, slope or incline of the projections or ribs 36, the projections or ribs 36 allow for a sliding or rolling action as the seal member 30 contacts the panel 22, 22' or mating connector, resulting in reduced friction compared to vertical ribs, thereby requiring less force to install or remove the seal member 30 and connector 2 from the panel 22, 22' or mating connector.

The angled, sloped or inclined orientation of the projections or ribs 36 allows the projections or ribs 36 to act as wedges, pushing against the mating panel and creating a tighter seal with lower force. Consequently, regardless of the thickness of the panel 22, 22' or mating connector, the seal member 30 seals the connector 2 to its mounting panel 22, 22' or mating connector. The seal member 30 ensures that the connector 2 will be sealed to the mounting panel 22, 22' or mating connector regardless of waviness in the panel 22, 22' or mating connector or variations in thickness of different panels 22, 22' or mating connector.

When the connector 2 is fully inserted onto the panel 22, 22' or mating connector, the seal member 30 is compressed. In the compressed state, the angled, sloped or inclined projections or ribs 36 allow for better contact with surface of the panel 22, 22' or mating connector, resulting in enhanced sealing performance. The angled, sloped or inclined orientation of the projections or ribs 36 helps to distribute the pressure evenly along the projections or ribs 36, reducing the chances of leaks or gaps in the seal member 30.

The angled, sloped or inclined orientation of the projections or ribs 36 allow the projections or ribs 36 to provide greater flexibility and conformity to irregularities in the mating surfaces of the panel 22, 22' or mating connector than vertical ribs. As the seal member 30 is compressed, the angled, sloped or inclined orientation of the projections or ribs 36 allow the projections or ribs 36 to adjust and conform to the surface of the panel 22, 22' or mating connector, ensuring a tight and reliable seal. This also can provide vibration dampening when needed.

The angled, sloped or inclined projections or ribs 36 are less prone to extrusion compared to vertical ribs. Extrusion occurs when the seal material is forced into gaps or clearances between mating surfaces under high pressure. The angled, sloped or inclined orientation of the projections or ribs 36 offer greater resistance to extrusion, providing a more reliable barrier against fluid or gas leakage.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed:

1. A sealed electrical connector comprising:
a housing having a flange extends laterally around the housing, the flange having a seal receiving recess;
a seal comprising:
a base member;
projections extending from the base member, each of the axes of the projections extending at an angle of greater than 90 degrees and less than 180 degrees relative to a longitudinal plane of the base member;
the seal being received in the seal receiving recess.

2. The sealed electrical connector as recited in claim 1, wherein the projections are spaced apart by a distance which allows the projections to deform when the connector is positioned on a panel.

3. The sealed electrical connector as recited in claim 1, wherein the base member has an arcuate or curved bottom surface.

4. The sealed electrical connector as recited in claim 1, wherein the axis of the each projection of the projections extend at the same angle relative to the plane of the base member.

5. The sealed electrical connector as recited in claim 1, wherein one or more of the angles that the axes of the projections extends relative to the longitudinal plane of the base member is between 110 degrees and 120 degrees.

6. The sealed electrical connector as recited in claim 5, wherein the projections are ribs.

7. The sealed electrical connector as recited in claim 6, wherein the ribs have first panel engaging surfaces which are sloped or inclined relative to the longitudinal plane of the base member at the same angle as the axes of the projections.

8. The sealed electrical connector as recited in claim 7, wherein the first panel engaging surfaces have second panel engaging surfaces provided proximate free ends of the ribs.

9. The sealed electrical connector as recited in claim 8, wherein the second panel engaging surfaces extend as an angle relative to the first panel engaging surfaces.

10. The sealed electrical connector as recited in claim 9, wherein the angle that the second panel engaging surfaces extend from the first panel engaging surfaces is between 30 degrees and 80 degrees.

11. A sealed panel mount electrical connector comprising:
a dielectric housing, the housing having a forward portion and a rearward portion, a flange extending laterally around the housing between the forward portion and the rearward portion, the flange having a seal receiving recess;
a seal member positioned on the dielectric housing, the seal member comprising:
a base member;
projections extending from the base member, axes of the projections extend at angles of greater than 0 degrees and less than 90 degrees relative to a longitudinal plane of the base member;
the seal member being received in the seal receiving recess.

12. The sealed panel mount electrical connector as recited in claim 11, wherein the base member has a retaining lip or projection which extends from an end thereof, the retaining projection is dimensioned to be received in a retaining recess which projects from the seal receiving recess.

13. The sealed panel mount electrical connector as recited in claim 11, wherein the base member has an arcuate or curved bottom surface, the arcuate or curved bottom surface provides a space between the arcuate or curved bottom surface and a surface of the flange.

14. The sealed panel mount electrical connector as recited in claim 13, wherein latches are provided on the housing, the latches are arranged in opposition to the flange.

15. The sealed panel mount electrical connector as recited in claim 11, wherein the angles that the axes of the projections extends relative to the longitudinal plane of the base member is between 110 degrees and 120 degrees.

16. The sealed panel mount electrical connector as recited in claim 15, wherein the axis of the each projection of the projections extend at the same angle relative to the plane of the base member.

17. The sealed panel mount electrical connector as recited in claim 16, wherein the projections are ribs.

18. The sealed panel mount electrical connector as recited in claim 17, wherein the ribs have first panel engaging surfaces which are sloped or inclined relative to the longitudinal plane of the base member at the same angle as the axes of the projections.

19. The sealed panel mount electrical connector as recited in claim 18, wherein the first panel engaging surfaces have second panel engaging surfaces provided proximate free ends of the ribs, the second panel engaging surfaces extend as an angle relative to the first panel engaging surfaces.

* * * * *